US009973681B2

(12) United States Patent
Somanathan et al.

(10) Patent No.: US 9,973,681 B2
(45) Date of Patent: May 15, 2018

(54) METHOD AND ELECTRONIC DEVICE FOR AUTOMATICALLY FOCUSING ON MOVING OBJECT

(71) Applicant: Samsung Electronics Co., Ltd., Suwon-si, Gyeonggi-do (KR)

(72) Inventors: Karthikeyan Somanathan, Bangalore (IN); Karthik Narayanan, Chennai (IN); Tapan Harishkumar Shah, Surat (IN); Vamsee Kalyan Bandlamudi, Guntur (IN); Jayakrishna Alapati, Bangalore (IN); Goun-young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 15/192,263

(22) Filed: Jun. 24, 2016

(65) Prior Publication Data

US 2017/0310876 A1 Oct. 26, 2017

(30) Foreign Application Priority Data

Jun. 24, 2015 (IN) ............................ 3180/CHE/2015
Apr. 20, 2016 (IN) ............................ 3180/CHE/2015

(51) Int. Cl.
| | | |
|---|---|---|
| *G03B 13/00* | (2006.01) | |
| *H04N 5/232* | (2006.01) | |
| *G06T 7/00* | (2017.01) | |
| *G02B 6/293* | (2006.01) | |

(52) U.S. Cl.
CPC ....... *H04N 5/23212* (2013.01); *G06T 7/0069* (2013.01); *H04N 5/23296* (2013.01); *G02B 6/29334* (2013.01); *G06T 2207/10052* (2013.01); *G06T 2207/10148* (2013.01)

(58) Field of Classification Search
CPC .......... H04N 5/23212; H04N 5/23296; H04N 13/0228; H04N 13/0232; H04N 13/0242; H04N 13/0282; G02B 7/28; G02B 6/29334; G06T 2207/10148; G06T 2207/10141; G06T 2207/10052; G06T 2207/21; G06T 2200/21; G03B 13/30
See application file for complete search history.

(56) References Cited

U.S. PATENT DOCUMENTS

| | | | |
|---|---|---|---|
| 7,301,133 B2 | 11/2007 | Weiss | |
| 8,027,582 B2 | 9/2011 | Li | |
| 8,208,058 B2 * | 6/2012 | Karasawa | .......... H04N 5/23212 348/345 |
| 8,432,479 B2 * | 4/2013 | Kane | .................. G02B 27/0075 348/252 |
| 8,891,000 B2 * | 11/2014 | Lee | .................... H04N 5/23222 348/157 |

(Continued)

*Primary Examiner* — Ngoc-Yen Vu
(74) *Attorney, Agent, or Firm* — Jefferson IP Law, LLP

(57) ABSTRACT

A method of an electronic device for automatically focusing on a moving object is provided. The method includes generating, by a processor, at least one focal code based on information comprising depth information of the moving object obtained using at least one previous position of the moving object, focusing, by the processor, on at least one portion of the moving object based on the at least one focal code, and capturing, by a sensor, at least one image of the moving object comprising the at least one portion of the moving object.

18 Claims, 14 Drawing Sheets

(56) References Cited

U.S. PATENT DOCUMENTS

| | | | |
|---|---|---|---|
| 9,479,703 B2* | 10/2016 | Yu | G01S 3/7864 |
| 9,565,416 B1* | 2/2017 | Lewkow | H04N 5/23212 |
| 2012/0075492 A1 | 3/2012 | Nanu et al. | |
| 2013/0169754 A1 | 7/2013 | Aronsson et al. | |
| 2013/0258167 A1 | 10/2013 | Gum | |
| 2014/0240578 A1 | 8/2014 | Fishman et al. | |
| 2015/0104101 A1* | 4/2015 | Bryant | G06T 7/0051 |
| | | | 382/171 |
| 2015/0292871 A1* | 10/2015 | Kaneko | G06T 5/002 |
| | | | 348/135 |
| 2017/0019589 A1* | 1/2017 | Moon | H04N 5/23222 |
| 2017/0054897 A1* | 2/2017 | Shanmugam | H04N 5/23212 |

* cited by examiner

AF succeeds

AF system will have focal code to fall upon
Moving Object will be in focus

AF succeeds

A  Object is not in focus
B  Estimating position of the object without focal code
C  Estimating position of the object with focal code

1102

METHOD AND ELECTRONIC DEVICE FOR AUTOMATICALLY FOCUSING ON MOVING OBJECT

CROSS-REFERENCE TO RELATED APPLICATION(S)

This application claims the benefit under 35 U.S.C. § 119(a) of an Indian patent application filed on Jun. 24, 2015 in the Indian Patent Office and assigned Serial number 3180/CHE/2015 and of an Indian patent application filed on Apr. 20, 2016 in the Indian Patent Office assigned Serial number 3180/CHE/2015, the entire disclosure of each of which is hereby incorporated by reference.

TECHNICAL FIELD

The present disclosure relates to imaging applications. More particularly, the present disclosure relates to a method and system for focusing on a moving object.

BACKGROUND

Generally, capturing images of moving objects in an auto focus (AF) mode is a key feature of digital single-lens reflex cameras (DSLRs). In an AF system, a mechanical delay is involved between a time point when a shutter button is pressed (e.g., shutter press, shutter-click event) and a time point when an image is captured due to movement of the object. Further, accuracy of the AF system may depend on three overriding factors such as underlying AF system hardware, the lens used in the AF system, and the accuracy of involved object tracking techniques.

AF systems of the related art rely heavily on object tracking techniques. Thus, in the AF systems of the related art, the closer the moving objects are to an image acquisition device, for example, a camera, the greater the impact on image quality during the image capture of the moving objects. In this scenario, slight movement of the camera can lead to significant changes in focus. Further, the impact of lack of focus becomes even more pronounced when heavier lenses (>85 mm) are employed. Furthermore, slower AF hardware systems can significantly impact image quality, for example, in terms of focus.

In the systems and methods of the related art, in predicting the position of a moving object based on position of the object when a shutter button is pressed, it is desirable for the time period between the shutter press and the capturing of an image of the moving object to be as small as possible. One of the constraints that existing systems face is that the AF is forced to set a focus point based on a predicted position of the moving object. As systems of the related art are heavily dependent on slower AF hardware, they allow too much time for fluctuations in the object movement, resulting in incorrect predictions.

The above information is presented as background information only to assist with an understanding the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for automatically focusing on a moving object.

In accordance with an aspect of the present disclosure, an electronic apparatus is provided. The electronic apparatus includes a processor configured to generate at least one focal code based on information comprising depth information of the moving object obtained using at least one previous position of the moving object, and focus on at least one portion of the moving object based on the at least one focal code, and a sensor configured to capture at least one image of the moving object comprising the at least one portion of the moving object.

In accordance with another aspect of the present disclosure, a method of an electronic device for automatically focusing on a moving object is provided. The method includes generating, by a processor, at least one focal code based on information comprising depth information of the moving object obtained using at least one previous position of the moving object, focusing, by the processor, on at least one portion of the moving object based on the at least one focal code, and capturing, by a sensor, at least one image of the moving object comprising the at least one portion.

Accordingly the various embodiments herein provide a non-transitory computer readable storage medium storing program instructions, which when executed by a computer, perform a method comprising: generating at least one focal code based on an information comprising a depth information of the moving object obtained using at least one previous position of the moving object, focusing on at least one portion of a moving object based on the at least one focal code, and configuring a sensor to capture at least one image of the moving object comprising the at least one portion of the moving object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
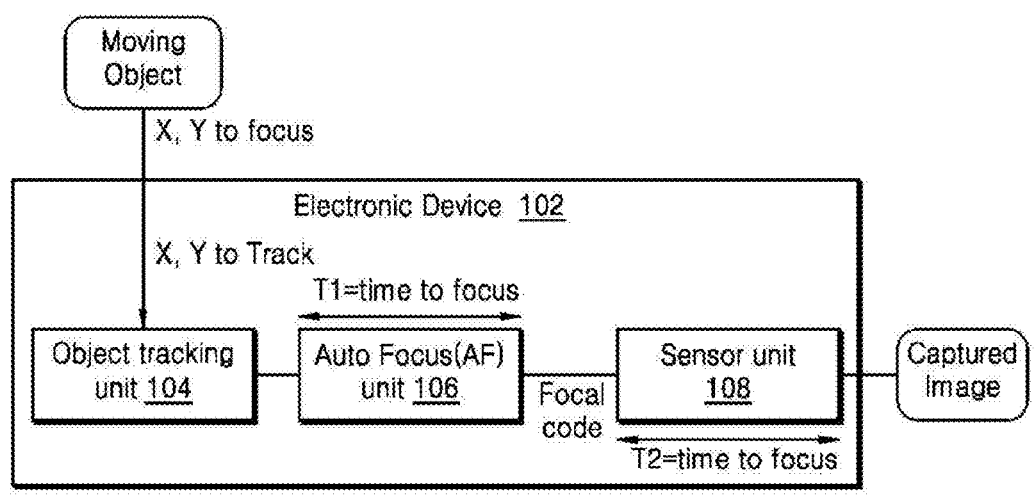
FIG. 1 is a block diagram illustrating a system related to a focusing on a moving object according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the systems and methods of the related art, an auto focus (AF) system may predict a position of the moving object based on its position when a shutter button is pressed. Very often, the AF system does not consider the depth information of the moving object when predicting the next position of the moving object. After predicting the position of the moving object, that is, where the moving object will be located at the next time instance, the AF system focuses on the predicted position. As the depth information of the moving object is not taken into consideration, there may be a chance of incorrect prediction of the position of the moving object. Further, accuracy of the AF system is based on the AF system hardware(s). Thus, a slower AF hardware allows too much time for fluctuations in the object movement, making the predictions incorrect. Further, accuracy of the AF system is based on the lens being used in the image acquisition device. Thus, focus on the moving object is affected when the object moves closer to or away from the camera (or sensor unit) of the image acquisition device. Further, the impact of lack of focus becomes even more pronounced when heavier lenses (>85 mm) are employed.

Unlike the systems and methods of the related art, the present disclosure considers the depth information of the moving object while predicting the position of the moving object accurately in next time instance.

Further, the present disclosure avoids dependency on the AF system hardware(s) while focusing on the moving object by the image acquisition device. Further, the present disclosure provides better focus when using heavier lenses (>85 mm) while focusing on moving objects that are moving towards the image acquisition device.

Referring now to the drawings, and more particularly to various embodiments discloses in FIGS. 2A to 14. Similar reference characters denote corresponding features consistently throughout the figures.

FIG. 1 illustrates an electronic device for automatically focusing on a moving object according to an embodiment of the present disclosure.

Referring to FIG. 1, in an embodiment, the electronic device 102, e.g., an image acquisition device may be, for example, a mobile phone, a smart phone, a personal digital assistant (PDA), a tablet, a camera, a digital single-lens reflex (DSLR) camera, a consumer electronic device, a dual display device, or any other electronic device. In an example embodiment, the electronic device 102 may include an object tracking unit 104, an AF unit 106, and a sensor unit 108, e.g., a sensor.

The object tracking unit 104 may predict a position (i.e., X-Y coordinates) of a moving object on which to focus. In an example embodiment, the moving object may be a living entity (e.g., human, animal, or the like) or a non-living entity (e.g., a vehicle). The object tracking unit 104 tracks the position (i.e., X-Y coordinates) of the moving object and may send the tracked position of the moving object to the AF unit 106.

After receiving the tracked position of the moving object, the AF unit 106 calculates a focal code. Based on the calculated focal code, the sensor unit 108 captures at least one image of the moving object, in a position according to the focal code is in focus, at the next time instance.

Figure 2A:
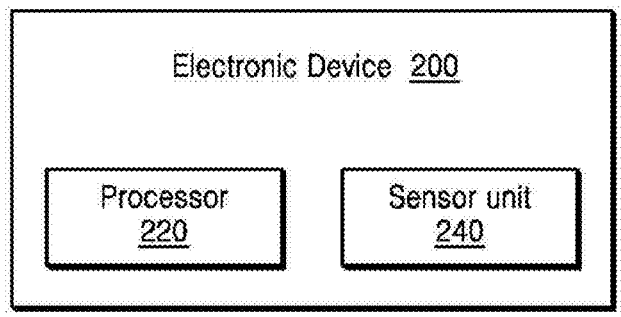
FIGS. 2A and 2B illustrate an electronic device for automatically focusing on a moving object according to various embodiments of the present disclosure.

FIG. 2A is a block diagram illustrating an electronic device according to an embodiment of the present disclosure.

Referring to FIG. 2A, the electronic device 200 for automatically focusing on a moving object may include a processor 220 and a sensor unit 240, e.g., a sensor.

The processor 220 may generate at least one focal code based on information comprising depth information of the moving object obtained using at least one previous position of the moving object and focus on at least one portion of a moving object based on the at least one focal code. In an embodiment, the at least one focal code may indicate at least one predicted coordinates of the moving object and the depth information is one of plurality of coordinates in XYZ plane, e.g., z-coordinate in XYZ plane. In an embodiment, the moving object is in a field of view of the sensor.

The processor 220 may correspond to one or a plurality of processors. The processor 220 may be implemented in an array of several logic gates or may be implemented in a combination of a general microprocessor and a memory in which a program that can be executed in the microprocessor is stored. Also, those skilled in the art may understand that the processor may be implemented in other hardware types.

In an embodiment, the processor may obtain a predicted position of the moving object based on the at least one previous position of the moving object and may generate at least one focal code based on the predicted position of the moving object. In an embodiment, the processor may track the at least one previous position of the moving object.

In an embodiment, the information may comprise blur information and the processor may obtain blur information of the moving object based on the at least one previous position of the moving object.

In an embodiment, the information may comprise a time delay between a time point when a shutter-click event is detected and a time point when an image of the moving object is captured.

In an embodiment, the processor may detect a shutter-click event for capturing the at least one image of the moving object, generate a sphere of interest based on the information, and generate the at least one focal code based on the sphere of interest.

The sensor 240 unit may capture at least one image of the moving object comprising the at least one portion of the moving object.

Referring to FIG. 2A, the sensor unit 240 consider depth information of the moving object in predicting the position of the moving object with respect to the next time instance. As the depth information of the moving object is considered, the position of the moving object is correctly predicted, thus leading to a positive user experience.

Figure 2B:
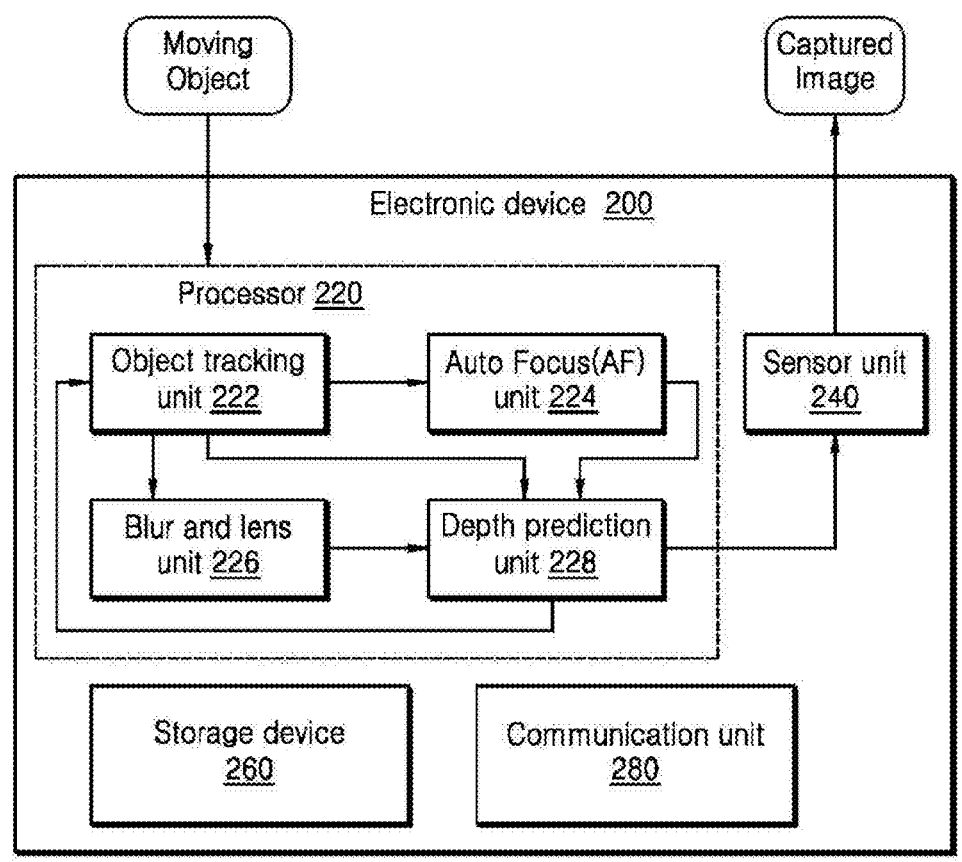

FIG. 2B is a block diagram illustrating an electronic device according to an embodiment of the present disclosure.

Referring to FIG. 2B, the electronic device 200, e.g., an image acquisition device, may automatically focus on a moving object. The electronic device 200 may include a processor 220, the sensor unit 240, e.g., a sensor, a storage device 260, and a communication unit 280.

The processor 220 may include the object tracking unit 222, the AF unit 224, a blur and lens unit 226, and a depth prediction unit 228.

The object tracking unit 222 may predict a position (i.e., X-Y coordinates) of a moving object on which to focus. In an example embodiment, the moving object may be a living entity (e.g., human, animal, or the like) or a non-living entity (e.g., a vehicle). In an example embodiment, the object tracking unit 222 tracks the position (i.e., X-Y coordinates) of the moving object and may send the tracked position of the moving object to the AF unit 224. In an example embodiment, the object tracking unit 222 may send the tracked position of the moving object to the AF unit 224, the blur and lens unit 226, and the depth prediction unit 228.

The blur and lens unit 226 may receive the tracked positions of the moving object from the object tracking unit 222. In an example embodiment, the blur and lens unit 226 may receive the predicted positions of the moving object indirectly from the depth prediction unit 228 via the object tracking unit 222 or, although not shown, directly from the depth prediction unit 228.

The blur and lens unit 226 may determine blur information of the moving object based on the tracked position of the moving object. In an example embodiment, based on the blur information and lens modeling data, the blur and lens unit 226 may determine a sphere of interest around or in a proximity of the moving object and send the sphere of interest the moving object to the depth prediction unit 228. Limits to the size of the sphere of interest or the proximity of the moving object may be set according to user or device specifications and are not limited to a specific size.

The depth prediction unit 228 may receive, from the blur and lens unit 226, data or information indicating distance traveled by the moving object. In an example embodiment, the depth prediction unit 228 may receive, from the object tracking unit 222, the current position of the moving object and a time delay between a shutter press time and an image capture time (e.g., a time delay between a shutter press and image capture of the electronic device 200).

In an example embodiment, the depth prediction unit 228 may predict depth information of the moving object (e.g., z-coordinates in an xyz plane) and generate one or more focal codes regarding the moving object. The focal codes generated by the depth prediction unit 228 may indicate predicted coordinates of the moving object as predicted by the depth prediction unit 228 based on movements of the moving object. For example, each focal code generated by the depth prediction unit 228 may indicate predicted coordinates of the moving object with respect to a time instance or time point. In an example embodiment, the electronic device 200 or the sensor unit 240 may focus on coordinates based on the focal codes generated by the depth prediction unit 228.

The depth prediction unit 228 may be calibrated or trained based on a comparison between one or more focal codes generated by the depth prediction unit 228 and one or more focal codes generated by the AF unit 224. For example, the depth prediction unit 228 may auto calibrate or automatically adjust one or more settings based on any differences between one or more focal codes generated by the depth prediction unit 228 and one or more focal codes generated by the AF unit 224. After the calibration or training period, the depth prediction unit 228 may send only the one or more focal codes generated by the depth prediction unit 228, rather than the one or more focal codes generated by the AF unit 224, to the sensor unit 240. However, the example embodiment is not limited thereto, and after the calibration or training period, the depth prediction unit 228 may send the one or more focal codes generated by the depth prediction unit 228, the one or more focal codes generated by the AF unit 224, or a combination thereof, to the sensor unit 240. In an example embodiment, use of the one or more focal codes generated by the depth prediction unit 228 may reduce the amount of time required for capturing at least one image of the moving object in which one or more portions of the moving object is in focus.

In an example embodiment, the AF unit 224 may be any AF system which generates a focal code based on position coordinates (e.g., x-y coordinates) received from the object tracking unit 104.

Further, the sensor unit 240 may detect a shutter-click event (e.g., a shutter press) and capture at least one image of the moving object based on the shutter-click event and the focal code provided by the depth prediction unit 228.

The storage device 260 may store one or more of the captured images. Further, the storage device 260 may include one or more computer-readable storage media. The storage device 260 may include non-volatile storage elements. Examples of such non-volatile storage elements may include magnetic hard discs, optical discs, floppy discs, flash memories, or any electrically programmable memories (EPROM) or electrically erasable and programmable (EEPROM) memories. In addition, the storage device 260 may, in some examples, be considered a non-transitory storage medium. The term "non-transitory" may indicate that the storage medium includes tangible items and excludes carrier waves and transient signals. However, the term "non-transitory" should not be interpreted to mean that the storage device 204 is non-movable. In some examples, the storage device 204 may be configured to store a larger amount of data than another memory included in the electronic device 200. In certain examples, a non-transitory storage medium may store data that can be modified (e.g., in random access memory (RAM) or cache).

The communication unit 280 may provide internal communication within the electronic device 200 and external communication between the electronic device 200 and networks.

Unlike the systems and methods of the related art, the proposed mechanism may be readily and easily implemented in mobile devices, cameras, and also in any electronic device with a camera, without any extra or extensive hardware setup. Further, the proposed mechanism may reduce focus times and improve image quality for image capture of moving objects moving towards or away from a camera. The proposed mechanism may produce the same effect irrespective of the sophistication or type of lens system.

Unlike the systems and methods of the related art, the proposed mechanism aims at keeping processing time to a minimum after a shutter press (e.g., shutter-click event) takes place. The proposed mechanism derives information from a lens unit, preview images and object tracking techniques and may provide a self-training or self-learning technique for focusing on moving objects. In the proposed mechanism, the depth information may be used consistently for generating at least one focal code indicating predicted coordinates of the moving object.

In an example, consider a scenario where a user is trying to capture an image including the face of a dog (i.e., moving object), which is in motion, using the electronic device 200, e.g., an image acquisition device. When a shutter is pressed or a shutter-click event is triggered, the electronic device 200 may predict the position of the dog in three dimensional (3D) spaces and its velocity in all three dimensions. The predicted position and velocity are used to generate a sphere of interest (i.e. an imaginary bounded sphere) about a focal point where the dog could be at a next time instance. Based on the sphere of interest, the sensor unit 240 may capture an image(s) of the face of the dog in which the face of the dog is in focus. In an example embodiment, the sensor unit 240 may capture an image(s) of the dog in which at least one portion of the dog (e.g., face, tail, feet) is in focus.

In another example, consider a scenario where auto focus of the AF unit 224 is impacted by motion in the "z" plane (e.g., depth information), as depth information may be critical in accurately tracking the position of a moving object. In such an example scenario, the proposed mechanism may reduce any impact which motion in the "z" plane may have on auto focus of the AF unit 224. Further, aspects of the present disclosure include consistently providing depth information as feedback to the object tracking unit 222, issues such as color occlusion, gradient issues may be prevented from affecting overall focus of the electronic device 200. Further, in lower grade AF systems, the change in focus during moving object tracking is slow. By using the proposed mechanism, focus time of the lower grade AF systems may be improved due to the use of generated focal codes indicating predicted coordinates of the moving object, and thus a moving object may be accurately tracked and not lost while moving.

The electronic device 200 in FIG. 2B and example embodiments thereof are not limited to the elements illustrated in FIG. 2B. The electronic device 200 can include any number of devices along with other hardware or software components capable of communicating with each other. In an example embodiment, the functions of object tracking unit 222, AF unit 224, Blur and lens unit 226, and Depth prediction unit 228 can be performed by a processor including less number of hardware or software components.

Figure 3A:
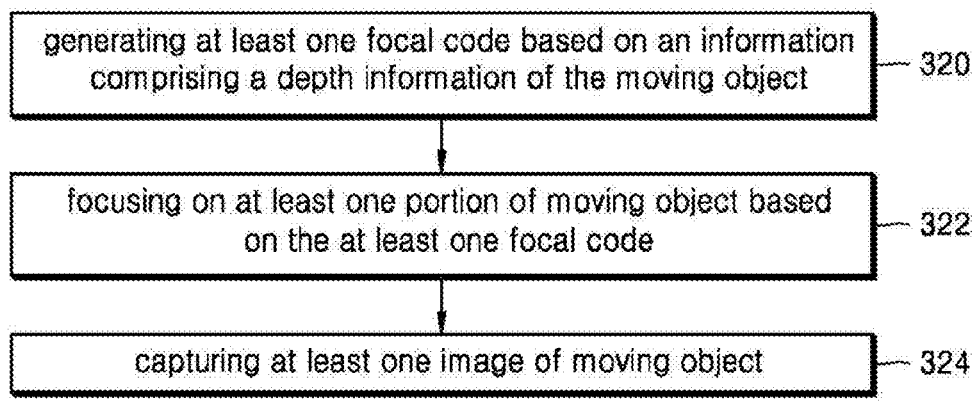
FIGS. 3A and 3B are flowcharts illustrating a method of automatically focusing on a moving object by an electronic device according to various embodiments of the present disclosure.

FIG. 3A is a flowchart illustrating a process in which an electronic device automatically focusing on a moving object according to an embodiment of the present disclosure.

Referring to FIG. 3A, at operation 320, the electronic device, e.g., a processor of the electronic device may generate at least one focal code based on information comprising depth information of the moving object obtained using at least one previous position of the moving object. In an embodiment, the electronic device may obtain a predicted position of the moving object based on the at least one previous position of the moving object and may generate at least one focal code based on the predicted position of the moving object.

In an embodiment, the electronic device may track the at least one previous position of the moving object. In an embodiment, the electronic device may obtain blur information of the moving object based on the at least one previous position of the moving object and the information comprises the blur information.

In an embodiment, the information may comprise a time delay between a time point when a shutter-click event is detected and a time point when an image of the moving object is captured. In an embodiment, the at least one focal code indicates at least one predicted coordinates of the moving object and the depth information is z-coordinates in XYZ plane.

In an embodiment, the electronic device may detect a shutter-click event for capturing the at least one image of the moving object; generate a sphere of interest based on the information; and generate the at least one focal code based on the sphere of interest.

At operation 322, the electronic device, e.g., a processor of the electronic device may focus on at least one portion of a moving object based on the at least one focal code. In an embodiment, the moving object is in a field of view of the sensor.

At operation 324, the electronic device, e.g., a processor of the electronic device may capture at least one image of the moving object comprising the at least one portion of the moving object comprising the at least one portion of the moving object.

In an embodiment, the electronic device store, in a storage device, the at least one captured image.

Figure 3B:
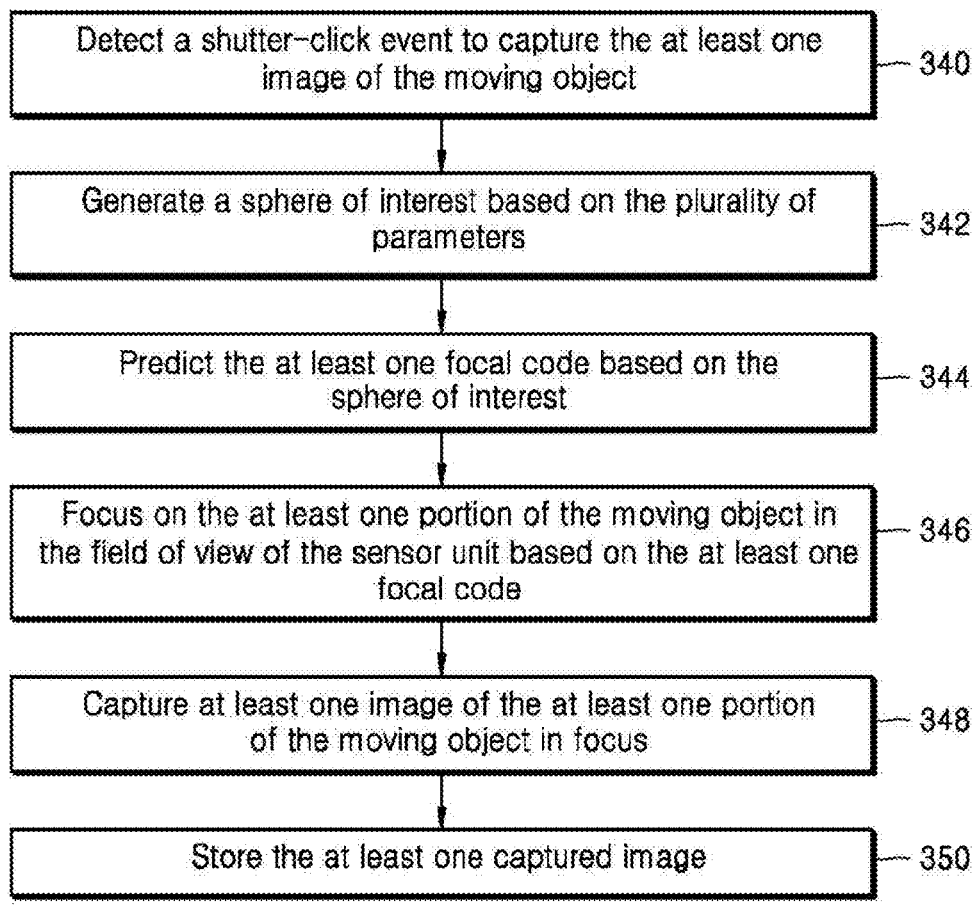

FIG. 3B is a flowchart illustrating a process in which an electronic device automatically focusing on a moving object according to an embodiment of the present disclosure.

Referring to FIG. 3B, at operation 340, the electronic device may detect a shutter-click event and capture at least one image of the moving object based on the shutter-click event. In an example embodiment, a sensor of the electronic device may detect the shutter-click event and capture at least one image of the moving object based on the shutter-click event. In an example embodiment, the moving object may be a living entity or a non-living entity.

At operation 342, the electronic device may generate a sphere of interest based on one or more parameters. In an example embodiment, a blur and lens unit of the electronic device may generate the sphere of interest based on the one or more parameters. In an example embodiment, the parameters may include information provided from the AF unit, the lens system, or the object tracking unit 104 of the electronic device. Further, the parameters may include movement of the moving object, scene-scan information, blur information, depth information. In an example embodiment, time delay between the time at which the shutter-click event is detected and the time at which the image of the moving object is captured.

At operation 344, the electronic device may generate, for a moving object in the field of view of the sensor of the electronic device, at least one focal code indicating predicted coordinates of at least one portion of the moving object based on the sphere of interest. In an example embodiment, the electronic device, depth prediction unit of the electronic device may predict at least one focal code for focusing on at least one portion of the moving object.

At operation 346, the electronic device may focus on the at least one portion of the moving object based on the at least one focal code. In an example embodiment, the electronic device, e.g., a processor of the electronic device may focus on the at least one portion of the moving object based on the at least one focal code.

At operation 348, the electronic device may capture at least one image of the moving object in which at least one portion of the moving object is in focus. In an example embodiment, the electronic device, e.g., a sensor of the electronic device may capture at least one image of the at least one portion of the moving object in focus.

At operation 350, the electronic device may store the at least one captured image. In an example embodiment, the electronic device, e.g., a storage device of the electronic device may store the at least one captured image.

The various actions, acts, blocks, operations, or the like in the method illustrated in FIG. 3B may be performed in the order presented, in a different order, or simultaneously. Further, in some example embodiments, some of the actions, acts, blocks, operations, or the like may be omitted, added, modified, skipped, or the like without departing from the scope of the disclosure.

Figure 4:
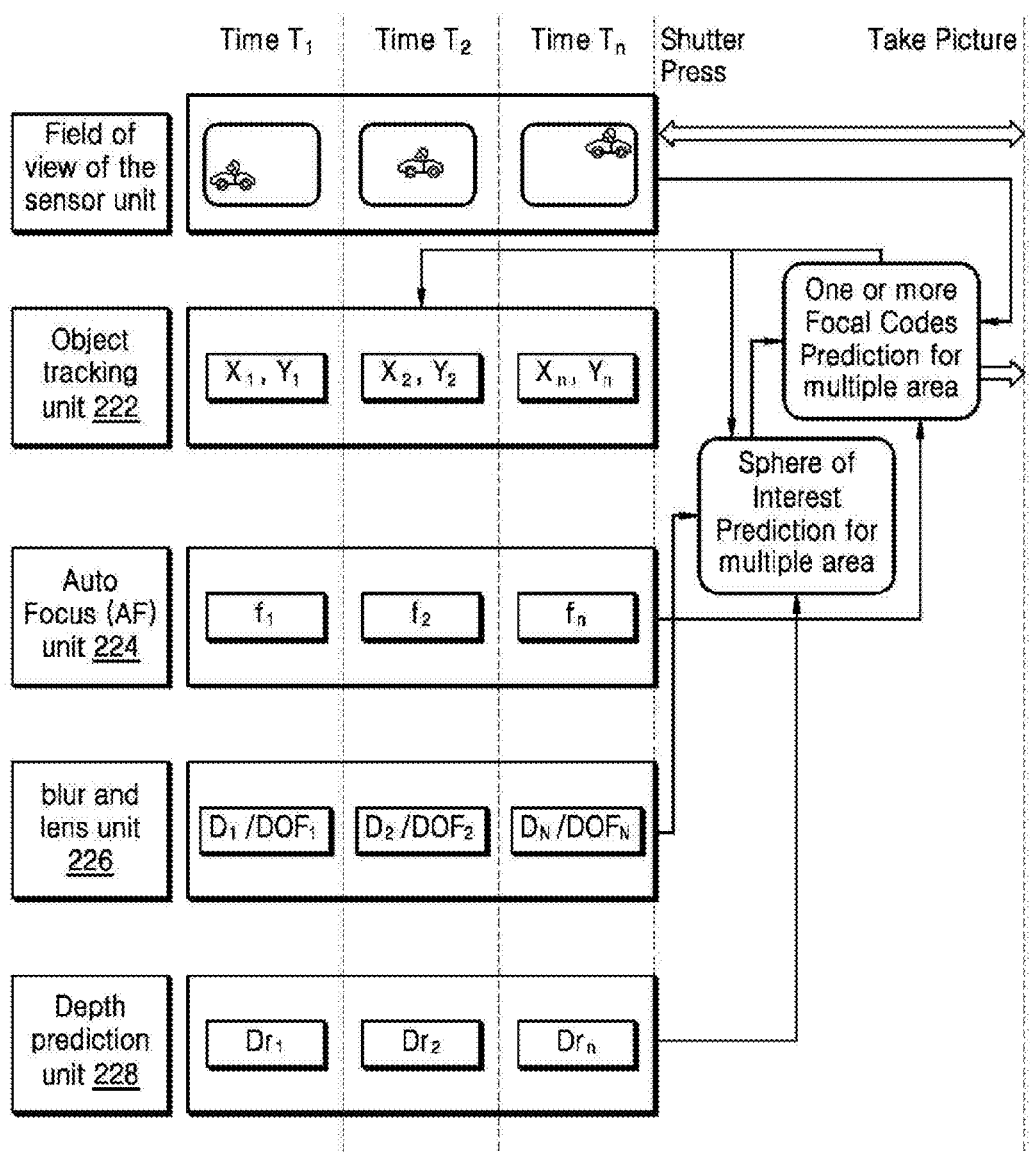
FIG. 4 illustrates an example of generating at least one focal code for at least one portion of a moving object according to an embodiment of the present disclosure.

FIG. 4 illustrates an example of generating at least one focal code for at least one portion of a moving object in the field of view of the electronic device 200, e.g. the sensor unit 240 in FIG. 2B based on one or more parameters, according to an embodiment of the present disclosure.

Referring to FIG. 4, the position of the moving object is tracked at different time instances which are described in detail below.

At time "$T_1$", the position (i.e., coordinates $X_1$, $Y_1$) of the moving object is tracked by the electronic device, e.g., the object tracking unit 222 in FIG. 2B. Based on the tracked position of the moving object, the electronic device, e.g., the AF unit 224 in FIG. 2B calculates a focal length ($f_1$) for the moving object. The focal length ($f_1$) for the moving object may indicate, regarding the electronic device 200, a distance between a lens system (or a lens included in the lens system) and the sensor unit 240 for focusing on a focal point corresponding to a predicted position of the moving object at the time "$T_1$". The electronic device, e.g., the blur and lens unit 226 in FIG. 2B may calculate an effective focus range (i.e., depth of field (DOF1)) with regard to the predicted position of the moving object at the time "$T_1$". Further, the blur and lens unit 226 may calculate a distance ($D_1$) from the sensor unit 240 to the predicted position of the moving object at the time "$T_1$" according to the effective focus range (i.e., DOF1). Further, based on the position of the moving object, the depth prediction unit 228 may predict the depth information (i.e., $Dr_1$) of the moving object. Furthermore, a sphere of interest may be generated based on $Dr_1$, $D_1$, and $DOF_1$.

At time "$T_2$", the position (i.e., coordinates $X_2$, $Y_2$) of the moving object is tracked by the object tracking unit 222. Based on the tracked position of the moving object, the AF unit 224 may calculate a focal length ($f_2$) for the moving object. Further, the blur and lens unit 226 may calculate an effective focus range (i.e., $DOF_2$) with regard to the predicted position of the moving object at the time "$T_2$". Further, the blur and lens unit 226 may calculate a distance ($D_2$) from the sensor unit 240 to the predicted position of the moving object at time "$T_2$" according to the effective focus range (i.e., DOF2). Further, based on the position of the moving object, the depth prediction unit 228 may predict the depth information (i.e., $Dr_2$) of the moving object. The sphere of interest may be generated based on $Dr_2$, $D_2$, and $DOF_2$.

At time "$T_N$", the position (i.e., coordinates $X_N$, $Y_N$) of the moving object is tracked by the object tracking unit 222. Based on the tracked position of the moving object, the AF unit 224 may calculate a focal length ($f_N$) for the moving object. Further, the blur and lens unit 226 may calculate an effective focus range (i.e., $DOF_N$) with regard to the predicted position of the moving object at the time "$T_N$". Further, the blur and lens unit 226 may calculate a distance ($D_N$) from the sensor unit 240 to the predicted position of the moving object at time "$T_N$" according to the effective focus range (i.e., $DOF_N$). Further, based on the position of the moving object, the depth prediction unit 228 may predict the depth information (i.e., $Dr_N$) of the moving object. The sphere of interest may be generated based on $Dr_N$, $D_N$, and $DOF_N$.

Further, after generating the sphere of interest at different times, the depth prediction unit 228 may generate the at least one focal code for the at least one portion of the moving object in the field of view of the sensor unit 240 based on the sphere of interest and the focal length(s) calculated by the AF unit 224. Further, the sensor unit 240 may focus on the at least one portion of the moving object in the field of view of the sensor unit 240 based on the at least one focal code. Further, the sensor unit 240 may capture at least one image of the moving object in which at least one portion of the moving object is in focus. Further, the present disclosure may include a concept of feeding back the at least one focal code for the at least one portion of the moving object to the object tracking unit 222.

Figure 5:
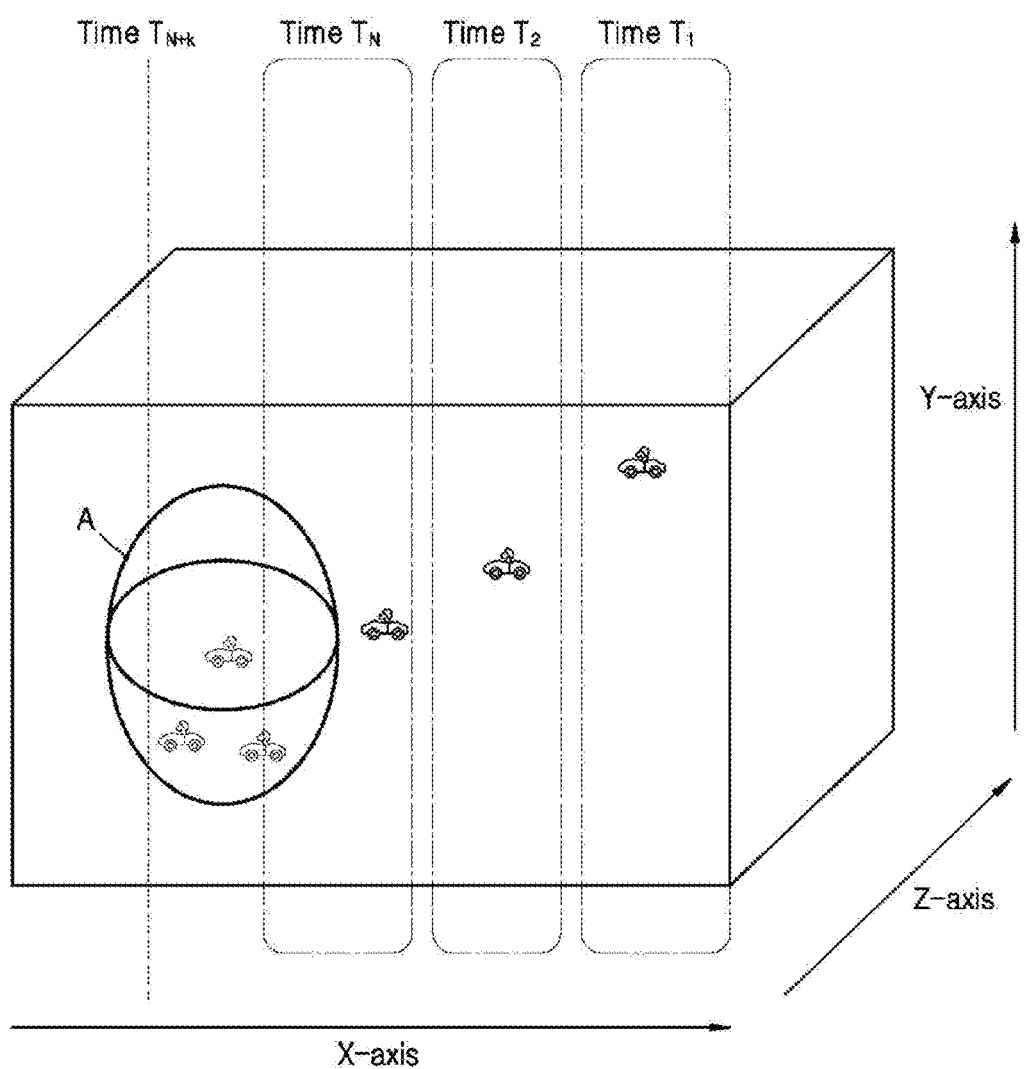
FIG. 5 illustrates an example of generating a sphere of interest according to an embodiment of the present disclosure.

FIG. 5 illustrates an example of generating a sphere of interest based on one or more parameters according to an embodiment of the present disclosure.

Referring to FIG. 5, in an example embodiment, the electronic device, e.g., depth prediction unit 228 in FIG. 2B may generate a sphere of interest (e.g., sphere of interest "A") at a time instance (e.g., $T_{N+k}$) based on at least one focal code for at least one portion of the moving object in the field of view of the sensor unit 240 based on the position information of the moving object at different time instances (e.g., $T_1$, $T_2$ . . . $T_N$) as shown in FIG. 5. The position information is calculated in 3D space (i.e., with respect to X, Y, and Z axes).

Figure 6A:
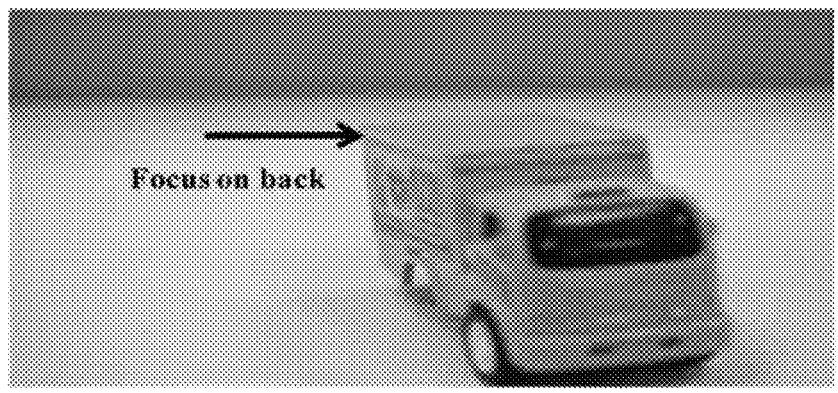
FIGS. 6A, 6B, and 6C illustrate examples of quick dynamic bracketing of a moving object according to various embodiments of the present disclosure.
Figure 6B:
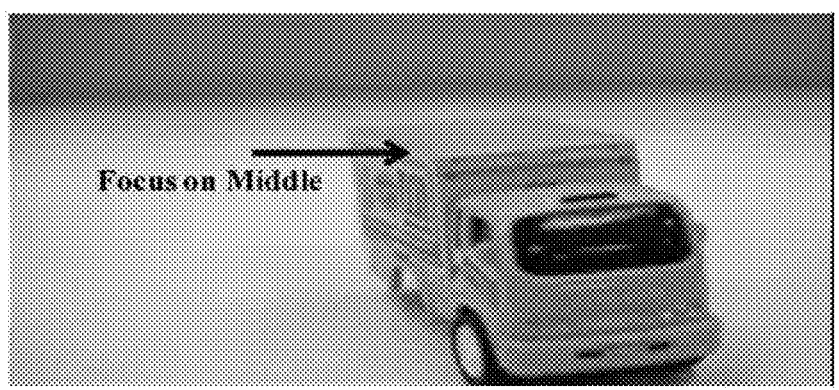
Figure 6C:
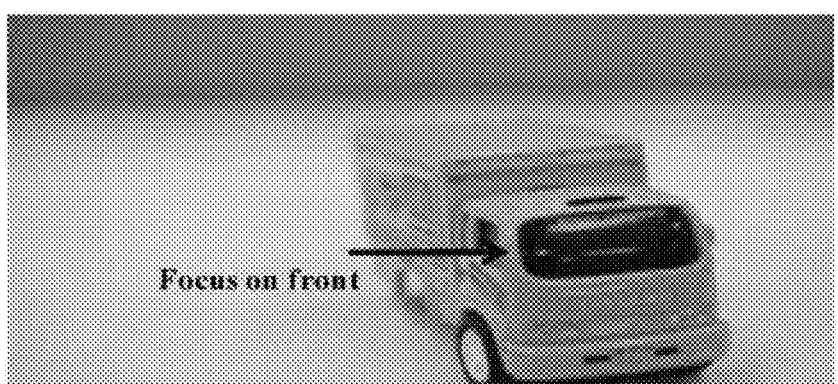

FIGS. 6A to 6C illustrate examples of capturing images of the moving object using dynamic bracketing according to an embodiment of the present disclosure. Dynamic bracketing refers to capturing multiple images of an object with different parts of the object being in focus in each image. For example, dynamic bracketing may include capturing a sequence of pictures of the same scene at a range of exposure settings. For example, consider a scenario where images of a moving object are to be captured, dynamic bracketing may include capturing images of the moving object at different focus settings.

Referring to FIG. 6A, the electronic device 200, e.g., the sensor unit 240 in FIG. 2B automatically focuses on a rear portion of the moving object. Referring to FIG. 6B, the sensor unit 240 automatically focuses on a middle portion of the moving object. Referring to FIG. 6C, the sensor unit 240 automatically focuses on a front portion of the moving object.

Figure 7A:
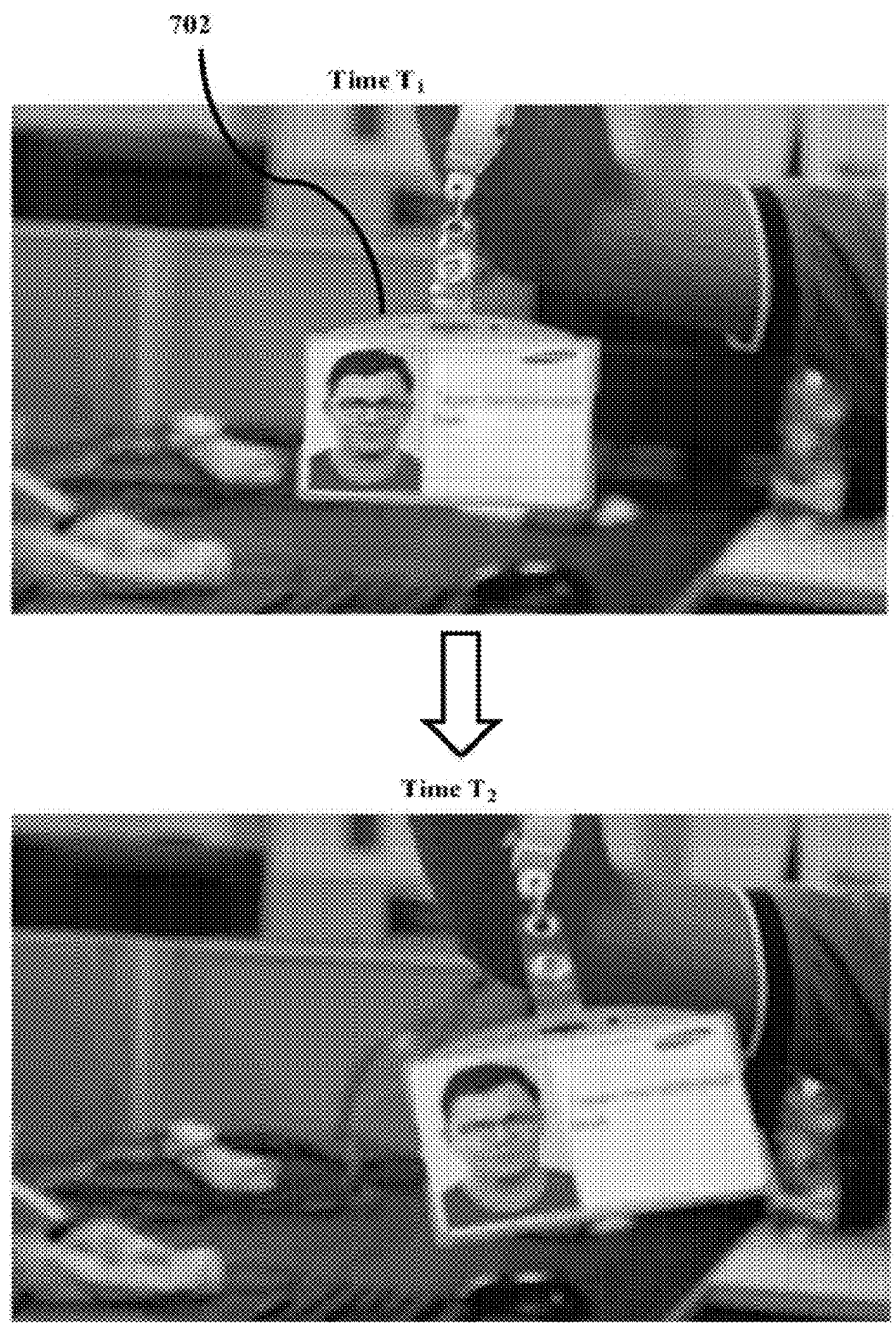
FIG. 7A illustrates an example of macro-tracking of an identity card according to the related art.

FIG. 7A illustrates an example of capturing an image of an identity card 702 while using macro-tracking, e.g., focus tracking at a macro setting, according to a mechanism of the related art.

Referring to FIG. 7A, a macro setting is used for capturing an image of an object that is relatively close to the electronic device, e.g., sensor unit 240 in FIG. 2B. In the context of FIG. 7A, the identity card 702 having an image of a user and details (such as name, title, or the like) is moved toward the sensor unit 240. Although the image is of a user's face, the image is not limited thereto. For example, the image may be any image or graphic corresponding to the user.

At time instance $T_1$, the electronic device, e.g., the processor 220 in FIG. 2B focuses on the face on the badge 702. The sensor unit 240 captures an image of the identity card 702 while the identity card 702 is in focus. Further, the sensor unit 240 does not consider depth information of the identity card 702 to predict the position thereof at the next time instance $T_2$. As the depth information of the identity card is not taken into consideration, the sensor unit 240 may incorrectly predict the position of the moving object at the time instance $T_2$. Thus, when the sensor unit 240 captures an image of the identity card 702 at the time instance $T_2$, the identity card 702 is out of focus, and the sensor unit 240 obtains a blurred image.

Figure 7B:
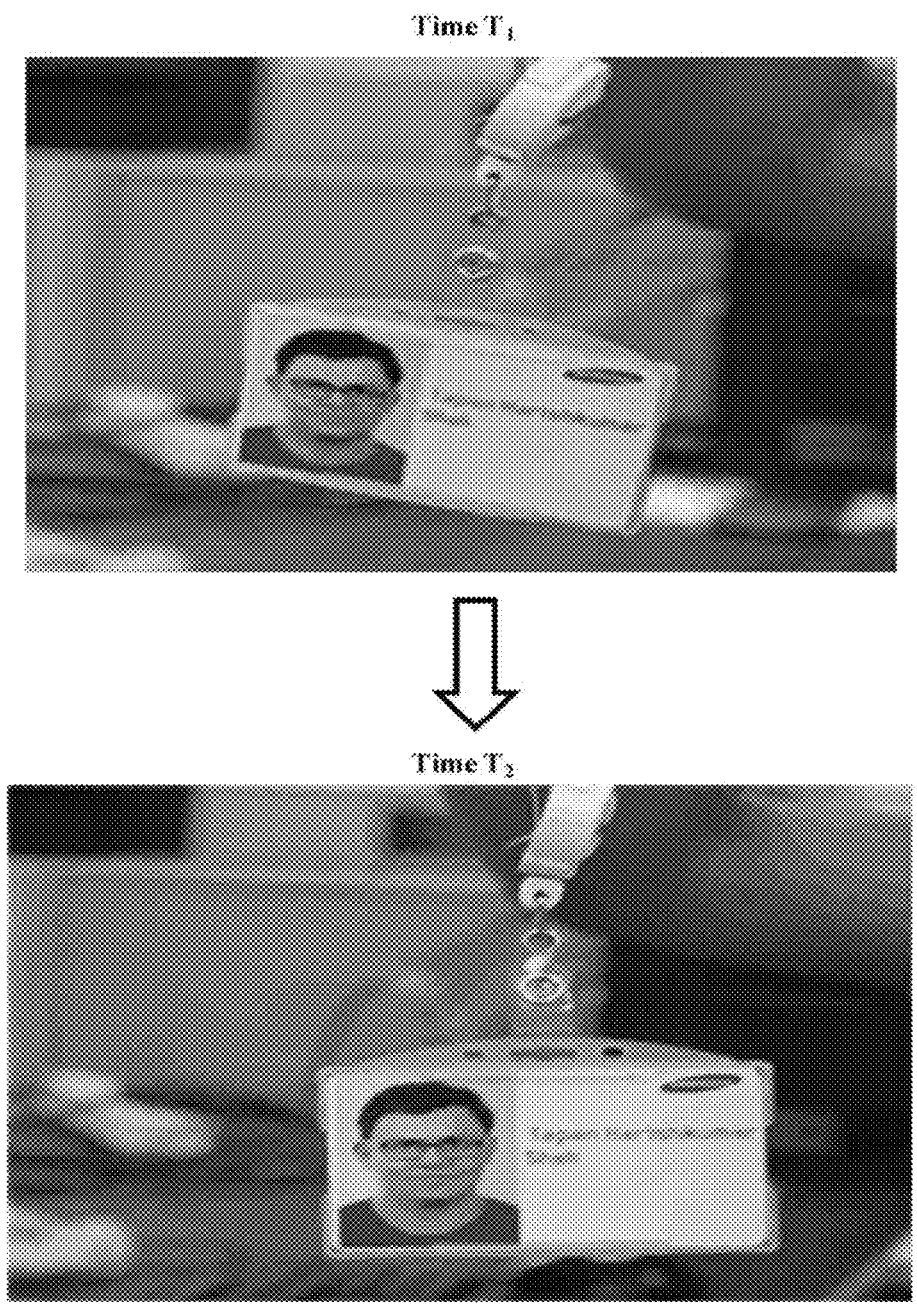
FIG. 7B illustrates an example of macro-tracking of an identity card according to an embodiment of the present disclosure.

Unlike the mechanisms of the related art, an example embodiment according to the present disclosure allows for automatically focusing on the identity card 702 by the electronic device 200 is described in conjunction with FIG. 7B.

FIG. 7B illustrates an example of capturing an image of an identity card 702 while using macro-tracking according to an embodiment of the present disclosure. Here, the electronic device, e.g., depth prediction unit 228 in FIG. 2B generates a sphere of interest for tracking the identity card 702 at different time instances. In an example, the generated sphere of interest may be a region corresponding to or generated based on the image of the user.

In an example embodiment, the user may define the sphere of interest for macro-tracking. In another example embodiment, the sphere of interest for macro-tracking may be defined automatically. Further, the depth prediction unit 228 may predict at least one focal code based on the sphere of interest. When the identity card 702 is in the field of view of the sensor unit 240, the sensor unit 240 may focus on of the image of the user located on the identity card 702 based on the at least one generated focal code.

Referring to FIG. 7B, the electronic device 200, e.g., the processor 220 automatically focuses on the image of the user located on the identity card 702 at the time instance $T_1$ based on the at least one generated focal code. Further, the processor 220 may automatically focus on the image of the user located on the identity card 702 at the time instance $T_2$ based on the at least one generated focal code. Unlike the systems and methods of the related art, the proposed mechanism may focus on at least one portion (e.g., the image of the user) of a macro object (e.g., identity card 702) while performing the macro-tracking.

Figure 8A:
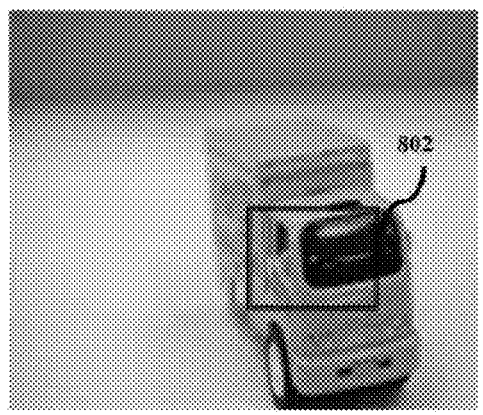
FIGS. 8A, 8B, and 8C illustrate examples of automatically focusing on a moving object in an electronic device when an auto focus (AF) unit fails to determine a focal point within a time period following a shutter-click event according to various embodiments of the present disclosure.
Figure 8B:
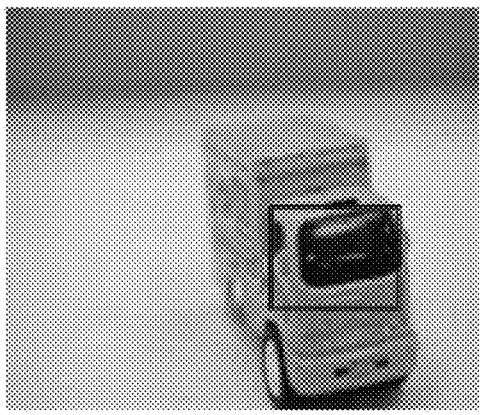
Figure 8C:
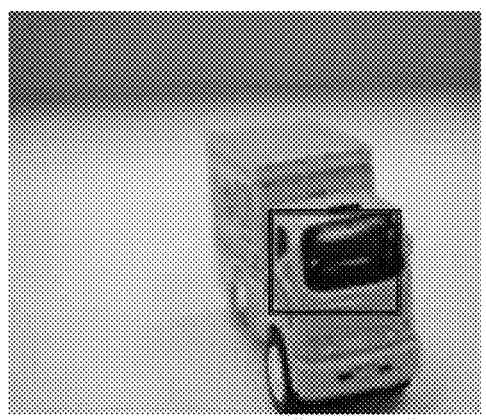

FIGS. 8A to 8C illustrate examples of automatically focusing on a moving object by the electronic device 200 when the AF unit 224 fails to determine a focal point within a time period following a shutter-click event (e.g., fails to determine a focal point by the time the sensor unit 240 is ready to capture an image of the moving object) according to an embodiment of the present disclosure. In systems and methods of the related art, consider a scenario where the AF unit 224 focuses on a windshield 802 of the moving object (i.e., truck) as shown in the FIGS. 8A to 8C. When the AF unit 224 works normally (e.g., determines a focal point), the AF unit 224 focuses on the windshield 802 of the truck. Further, when the AF unit 224 fails to work normally, it is difficult for the AF unit 224 to focus on the windshield 802 of the truck.

In a general scenario, when the AF unit 224 fails to work normally, the sensor unit 240 may be unable to track of the moving object. Unlike the systems and methods of the related art, in an example embodiment according to the present disclosure, the electronic device 200, e.g., the processor 220 may focus on at least one portion (i.e., the windshield 802) of the truck even if the AF unit 224 fails to work normally. As the proposed mechanism utilizes the generated focal code (which may indicate a predicted position of a moving object at a time instance) for the truck, the sensor unit 240 may capture an image of the moving object in which the at least one portion (i.e., the windshield 802) is in focus even if the AF unit 224 fails to work normally.

Referring to FIG. 8A, the processor 220 automatically focuses on the windshield 802 of the truck when the AF unit 224 works normally. Referring to FIG. 8B, even if the AF unit 224 fails to work normally, the processor 220 may still automatically focus on the windshield 802 of the truck. Referring to FIG. 8C, the processor 220 automatically focuses on the windshield 802 of the truck based on the generated focal code for the truck.

Figure 9:
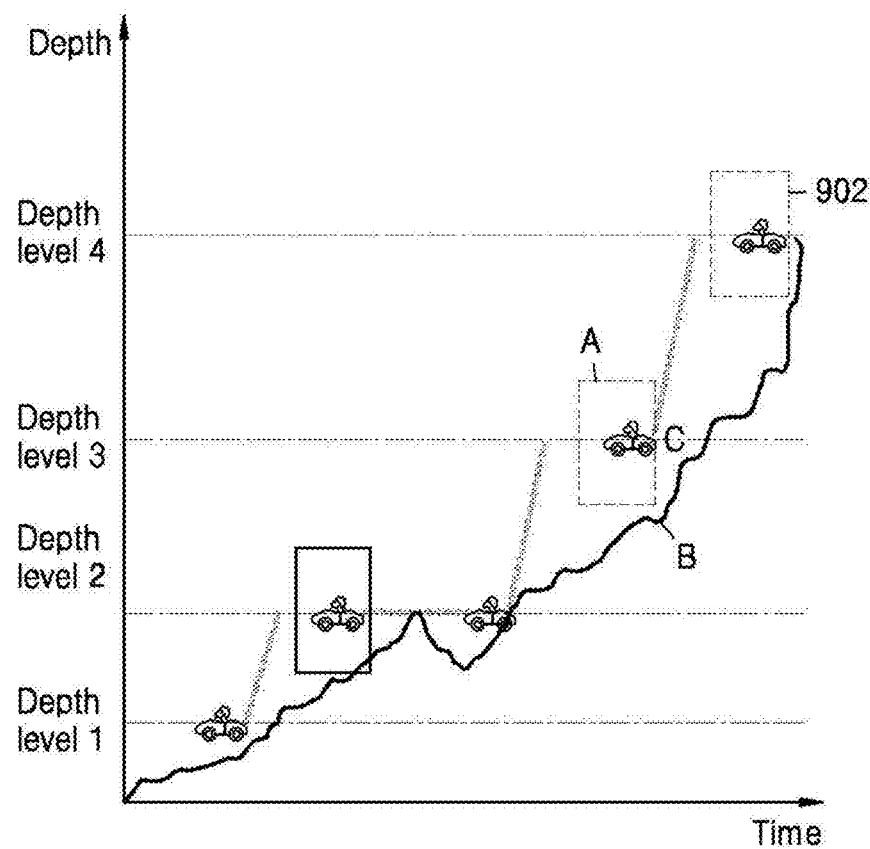
FIG. 9 illustrates an example of automatically focusing on a moving object for slow AF systems according to an embodiment of the present disclosure.

FIG. 9 illustrates an example of automatically focusing on moving objects for slow AF systems according to an embodiment of the present disclosure. In systems and methods of the related art which predict the position of a moving object 902 in the field of view of the electronic device 200, e.g., a sensor unit 240 without utilizing a focal code(s) for focusing on at least one portion of the moving object, an image acquisition device may be unable to accurately predict the location of the moving object (e.g., the image acquisition device may only be able to predict that the moving object will be located within a broad area "A" or may incorrectly predict that the moving object will be located at a location "B"). Unlike the systems and methods of the related art, the proposed mechanism may predict at least one focal code. Further, by utilizing the at least one focal code, the proposed mechanism may more accurately predict the position of the moving object at different time points compared to the systems and methods of the related art. For example, referring to FIG. 9, the sensor unit 240 may more accurately predict that the moving object will be located at a position "C".

Figure 10A:
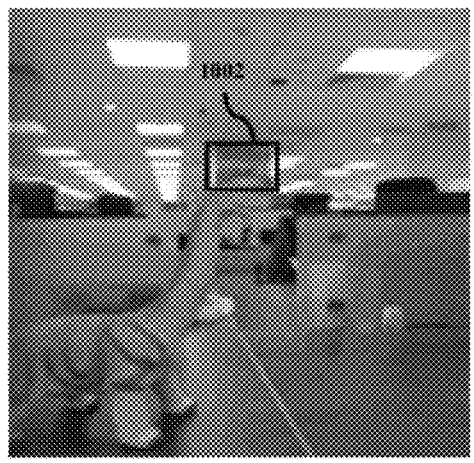
FIGS. 10A, 10B, and 10C illustrate examples of focusing after zooming, in which focusing time is reduced according to various embodiments of the present disclosure.
Figure 10B:
Figure 10C:
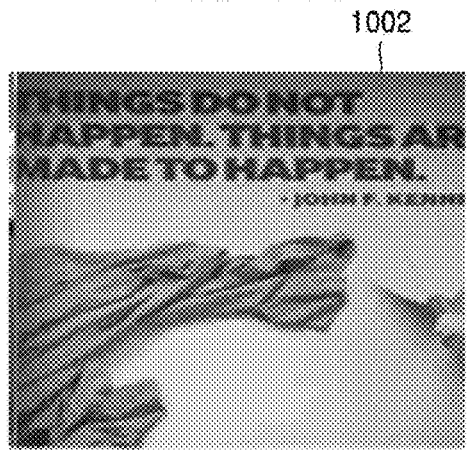

FIGS. 10A to 10C illustrate examples of focusing after zooming, in which focusing time is reduced according to an example embodiment of the present disclosure. In systems and methods of the related art which focus on object in the field of view of electronic device 200, e.g., a sensor unit 240 without utilizing a focal code(s), consider a scenario when the user uses an optical zoom function of the electronic device 200, e.g., image acquisition device to zoom in on an object. The electronic device 200, e.g., the AF unit 224 requires time to refocus on the object while or after zooming (i.e., focusing time), as information related to focusing on the object or a predicted position of the object (e.g., focal codes) is not available to the AF unit 224. Unlike the systems and methods of the related art, the proposed mechanism may generate one or more focal codes indicating predicted coordinates of the moving object with respect to a time instance or time point. Further, the present disclosure may provide for maintaining focus on or automatically focusing on predicted coordinates corresponding to at least one portion of a moving object (i.e. the object 1002 as shown in FIG. 10A) in the field of view of the sensor unit 240 based on the at least one generated focal code, even when zooming in on the object using the optical zoom function of the electronic device 200. The focusing time of the proposed mechanism may be less than the focusing time required by systems and methods of the related art.

Referring to FIG. 10A, the processor 220 may automatically focus on the object 1002 at a first time instance while or after zooming. Referring to FIG. 10B, the processor 220 may automatically focus on the object 1002 at a second time instance while or after zooming. Referring to FIG. 10C, the processor 220 may automatically focus on the object 1002 at a third time instance while or after zooming.

FIGS. 11A to 11D illustrate improved high-speed continuous shots according to an embodiment of the present disclosure. In systems and methods of the related art, consider a scenario when the user uses a high speed image capture function of the electronic device 200, e.g., image acquisition device when capturing an image or images of an object. During high-speed continuous image capture, the electronic device, e.g., AF unit 224 requires time to refocus on the object each time an image is captured, as information related to focusing on the object (i.e., the focal codes) is not available to the AF unit 224. Thus, the object may be out of focus in one or more of the captured images.

Unlike the systems and methods of the related art, the proposed mechanism may predict at least one focal code. Further, the present disclosure may provide for maintaining focus on or automatically focusing on predicted coordinates corresponding to at least one portion of an object (i.e. the object 1102 as shown in FIG. 11A) in the field of view of the electronic device 200, e.g., the sensor unit 240 based on the one or more generated focal codes, even when using a high speed image capture function of the electronic device 200 when capturing an image or images of an object.

Figure 11A:
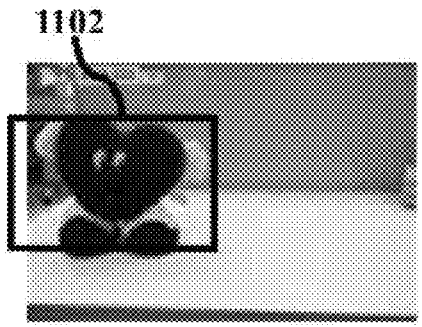
FIGS. 11A, 11B, 11C, and 11D illustrate improved high speed continuous shots according to various embodiments of the present disclosure.
Figure 11B:
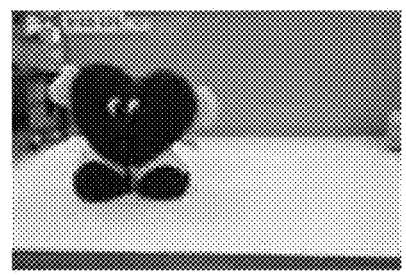
Figure 11D:
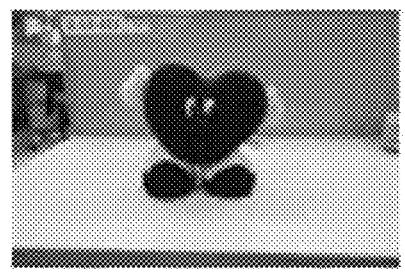
Figure 11C:
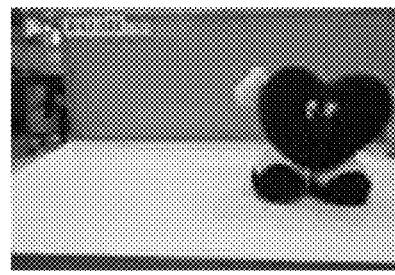

Referring to FIG. 11A, the electronic device 200, e.g., the processor 220 may automatically focus on the object 1102 while capturing an image at a first time instance during high-speed continuous image capture. Referring to FIG. 11B, the processor 220 may automatically focus on the object 1102 while capturing an image at a second time instance during high-speed continuous image capture. Referring to FIG. 11C, the processor 220 may automatically focus on the object 1102 while capturing an image at a third time instance during high-speed continuous image capture. Referring to FIG. 11D, the processor 220 may automatically focus on the object 1102 while capturing an image at a fourth time instance during high-speed continuous image capture.

Figure 12A:
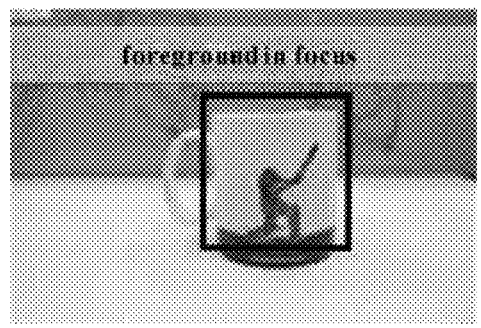
FIGS. 12A and 12B illustrate multiple image captures including object tracking according to various embodiments of the present disclosure.
Figure 12B:
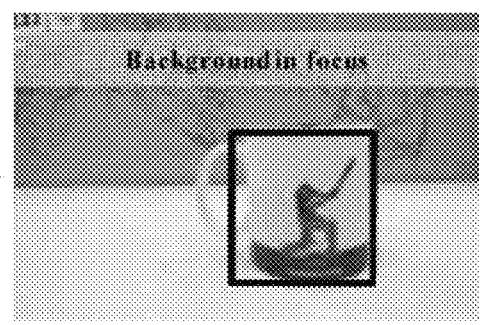

FIGS. 12A and 12B illustrate multiple image captures including object tracking according to an embodiment of the present disclosure. In systems and methods of the related art, when a user uses an object tracking function of the electronic device 200, e.g., image acquisition device when capturing an image or images of an object, the electronic device, e.g., the sensor unit 240 only captures an image in which one of the foreground or background of an environment where the object is present is in focus.

Unlike the systems and methods of the related art, due to the object tracking function of the electronic device 200 according to the present disclosure, the electronic device 200, e.g., the sensor unit 240 may capture, for example, respective images of an object in which the foreground and the background are in focus.

Referring to FIG. 12A, the sensor unit 240 may capture an image of the object while keeping the foreground in focus. Referring to FIG. 12B, the sensor unit 240 may capture an image of the object while keeping the background in focus. In an example embodiment, the processor 220 may combine multiple images (e.g., the image in which the foreground is in focus and the image in which the background is in focus), or portions of each image, into a single image in which select areas are in focus.

FIGS. 13A to 13D illustrate multiple image captures according to area/object selection and capture order according to an embodiment of the present disclosure. In systems and methods of the related art, when a user uses an image capture function of the electronic device 200, e.g., image acquisition device to capture images of multiple objects located in an area (e.g., workplace of an employee), the electronic device 200, e.g., the sensor unit 240 only captures an image in which one of the objects located in the area is in focus. Unlike the systems and methods of the related art, the electronic device 200 according to the present disclosure may use an object tracking function according to area/object selection and capture order when capturing images of multiple objects located in an area. For example, using the electronic device 200, the user may select areas 1302, 1304 and 1306 when capturing images of multiple objects (e.g., objects respectively located in areas 1302, 1304 and 1306) located in the area.

Figure 13A:
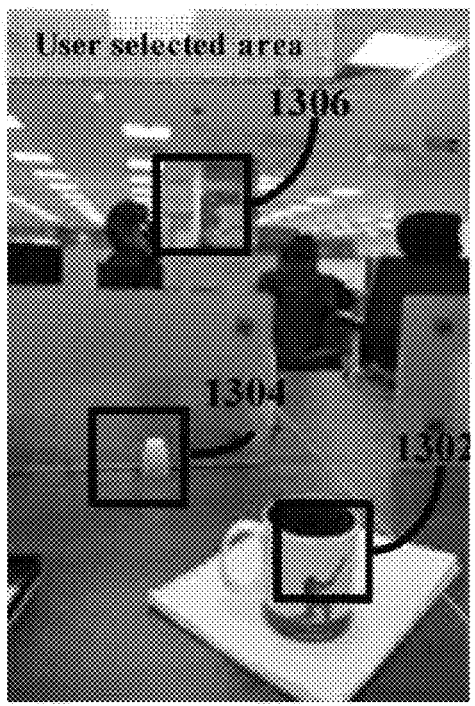
FIGS. 13A, 13B, 13C, and 13D illustrate multiple image captures according to area/object selection and capture order according to various embodiments of the present disclosure.
Figure 13D:
Figure 13B:

Referring to FIG. 13B, in an example embodiment, the sensor unit 240 may capture an image of the object in which the foreground is in focus.

Referring to FIG. 13B, the sensor unit 240 may capture a first image in which the area 1302 is in focus and displays the first image accordingly, based on the order above as set by the user (e.g., the user selected the area 1302 as a first area).

Figure 13C:

Referring to FIG. 13C, the sensor unit 240 may capture a second image in which the area 1304 is in focus and displays the second image accordingly, after displaying the first image, based on the order above as set by the user (e.g., the user selected the area 1304 as a second area).

Referring to FIG. 13D, the sensor unit 240 may capture the scene by considering the area 1306 in focus and display the order as 3 (i.e., the user has selected the area 1306 after selecting the area 1304).

Although FIGS. 13A to 13D illustrate where the electronic device 200 according to an example embodiment of the present disclosure outputs three different images, the example embodiment is not limited thereto. In an example embodiment, the processor 220 may combine multiple images (e.g., the first through third images), or portions of each image, into a single image in which objects in areas 1302, 1304 and 1306 are all in focus.

Figure 14:
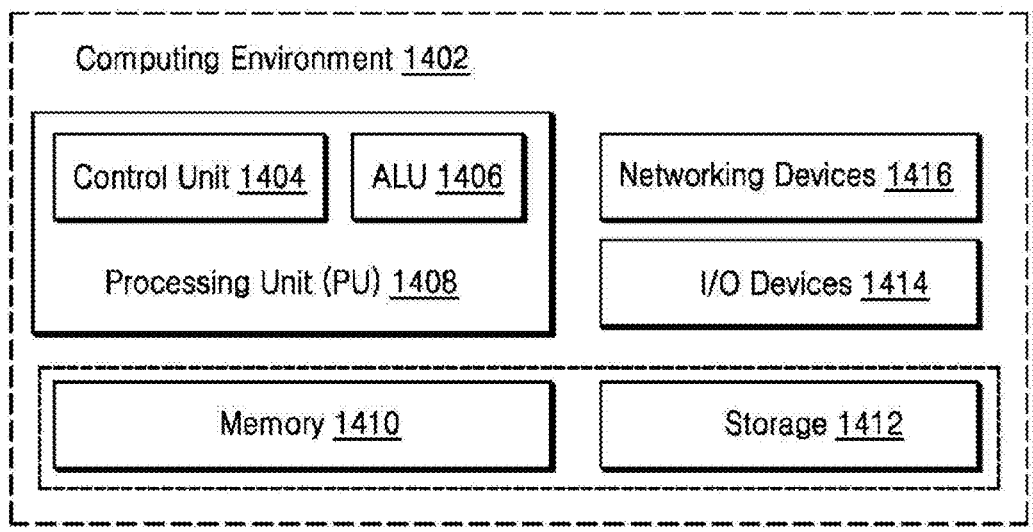
FIG. 14 illustrates a computing environment implementing the method and system for automatically focusing on a moving object by an electronic device according to an embodiment of the present disclosure.

FIG. 14 illustrates a computing environment 1402 implementing the method and system for automatically focusing on the moving object by the electronic device 200 according to an embodiment of the present disclosure.

As illustrated in the FIG. 14, the computing environment 1402 includes at least one processor 1408 that is equipped with a controller 1404 and an arithmetic logic unit (ALU) 1406, a memory 1410, a storage device 1412, a plurality of networking devices 1416 and a plurality of input/output (I/O) devices 1414. The processor 1408 is responsible for processing instructions. The processor 1408 may receive commands from the controller 1404. Further, any logical and arithmetic operations involved in the execution of the instructions may be computed at least in-part by the ALU 1406.

The overall computing environment 1402 may be composed of any number of homogeneous or heterogeneous cores, central processing units (CPUs) of different kinds, media and other accelerators. Further, the computing environment 1402 may include one or more processors 1408 located on a single chip or over multiple chips.

The example embodiments above may be implemented as computer instructions, computer code or an algorithm stored in the memory unit 1410, the storage 1412, or both. At the time of execution, the instructions may be fetched from the memory 1410 or storage 1412 and executed by the processor 1408.

In the case of any hardware implementations, various networking devices 1408 or external I/O devices 1414 may be connected to the computing environment 1402 to support the implementations.

The example embodiments disclosed herein may be implemented through at least one software program running on at least one hardware device and performing network management functions to control the elements. The elements shown in the FIGS. 2 to 14 include blocks which may be at least one of a hardware device or a combination of a hardware device and software units.

The foregoing description of the example embodiments will so fully reveal the general nature of the example embodiments herein that others can, by applying current knowledge, readily modify or adapt for various applications such example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of present disclosure as defined by the appended claims and their equivalents.

What is claimed is:

1. A method of an electronic device for automatically focusing on a moving object, the method comprising:
   generating, by at least one processor, a sphere of interest based on at least one parameter, wherein the at least one parameter comprises movement of the moving object;
   generating, by the at least one processor, at least one focal code based on the sphere of interest, wherein the at least one focal code includes at least one predicted coordinate in an XYZ plane of the moving object, the at least one predicted coordinate comprising a z-coordinate in the XYZ plane corresponding to a depth information of the moving object obtained using at least one previous position of the moving object;
   focusing, by the at least one processor, on at least one portion of the moving object based on the at least one focal code; and
   capturing, by a sensor, at least one image of the moving object comprising the at least one portion of the moving object.

2. The method of claim 1, wherein the generating of the at least one focal code comprises:
   obtaining a predicted position of the moving object based on the at least one previous position of the moving object; and
   generating the at least one focal code based on the predicted position of the moving object.

3. The method of claim 1, wherein the generating of the at least one focal code comprises tracking the at least one previous position of the moving object.

4. The method of claim 1, wherein the generating of the at least one focal code comprises consistently providing the at least one focal code for the at least one portion of the moving object.

5. The method of claim 1,
   wherein the information further comprises blur information, and
   wherein the generating of the at least one focal code comprises obtaining the blur information of the moving object based on the at least one previous position of the moving object.

6. The method of claim 1, wherein the generating of the at least one focal code further comprises:
   generating the at least one focal code based on a time delay between a time point when a shutter-click event is detected and a time point when an image of the moving object is captured.

7. The method of claim 1, wherein the generating of the at least one focal code comprises:
   detecting a shutter-click event for capturing the at least one image of the moving object.

8. The method of claim 1, wherein the moving object is in a field of view of the sensor.

9. An electronic device for automatically focusing on a moving object, the electronic device comprising:
   at least one processor configured to:
      generate a sphere of interest based on at least one parameter, wherein the at least one parameter comprises movement of the moving object;
      generate at least one focal code based on the sphere of interest, wherein the at least one focal code includes at least one predicted coordinate in an XYZ plane of the moving object, the at least one predicted coordinate comprising a z-coordinate in the XYZ plane corresponding to a depth information of the moving object obtained using at least one previous position of the moving object; and
      focus on at least one portion of the moving object based on the at least one focal code; and
   a sensor configured to capture at least one image of the moving object comprising the at least one portion of the moving object.

10. The electronic device of claim 9, wherein the at least one processor is further configured to:
    obtain a predicted position of the moving object based on the at least one previous position of the moving object; and generate the at least one focal code based on the predicted position of the moving object.

11. The electronic device of claim 9, wherein the at least one processor is further configured to consistently provide the at least one focal code for the at least one portion of the moving object.

12. The electronic device of claim 9, wherein the at least one processor is further configured to track the at least one previous position of the moving object.

13. The electronic device of claim 9,
wherein the information further comprises blur information, and
wherein the at least one processor is further configured to:
obtain the blur information of the moving object based on the at least one previous position of the moving object, and
generate at least one focal code based on the blur information.

14. The electronic device of claim 9, wherein the generating of the at least one focal code further comprises:
generating the at least one focal code based on a time delay between a time point when a shutter-click event is detected and a time point when an image of the moving object is captured.

15. The electronic device of claim 9, wherein the at least one processor is further configured to:
detect a shutter-click event for capturing the at least one image of the moving object.

16. The electronic device of claim 9, further comprising:
a storage device configured to store the at least one captured image.

17. The electronic device of claim 9, wherein the moving object is in a field of view of the sensor.

18. A non-transitory computer readable storage medium storing program instructions, which when executed by a computer, perform a method comprising:
generating a sphere of interest based on at least one parameter, wherein the at least one parameter comprises movement of the moving object;
generating at least one focal code based on the sphere of interest, wherein the at least one focal code includes at least one predicted coordinate in an XYZ plane of the moving object, the at least one predicted coordinate comprising a z-coordinate in the XYZ plane corresponding to a depth information of the moving object obtained using at least one previous position of the moving object;
focusing on at least one portion of the moving object based on the at least one focal code; and
configuring a sensor to capture at least one image of the moving object comprising the at least one portion of the moving object.

* * * * *